United States Patent [19]

Peterson

[11] 3,764,720

[45] Oct. 9, 1973

[54] SPEED AND BEARING INTEGRATOR

[75] Inventor: Robert F. Peterson, Burbank, Calif.

[73] Assignee: The United State of America as represented by the Secretary of the Navy

[22] Filed: Jan. 11, 1971

[21] Appl. No.: 105,505

[52] U.S. Cl. ............................................. 35/10.4
[51] Int. Cl. .......................................... G09b 9/00
[58] Field of Search .................................... 35/10.4

[56] References Cited
UNITED STATES PATENTS

| | | | |
|---|---|---|---|
| 2,854,764 | 10/1958 | Pierce et al. | 35/10.4 |
| 2,948,970 | 8/1960 | Carruthers et al. | 35/10.4 |
| 3,007,257 | 11/1961 | Mortimer | 35/10.4 |

Primary Examiner—T. H. Tubbesing
Attorney—Richard S. Sciascia, John W. Pease and John F. Miller

[57] ABSTRACT

In an antisubmarine warfare training device a speed and bearing integrator is provided to control the simulation of a submarine "signature." Differentially interconnected speed and bearing setting means are used to selectively position two readout heads on a rotating disk having two sets of information recorded thereon. Speed and bearing controls can be adjusted independently without affecting each other.

2 Claims, 2 Drawing Figures

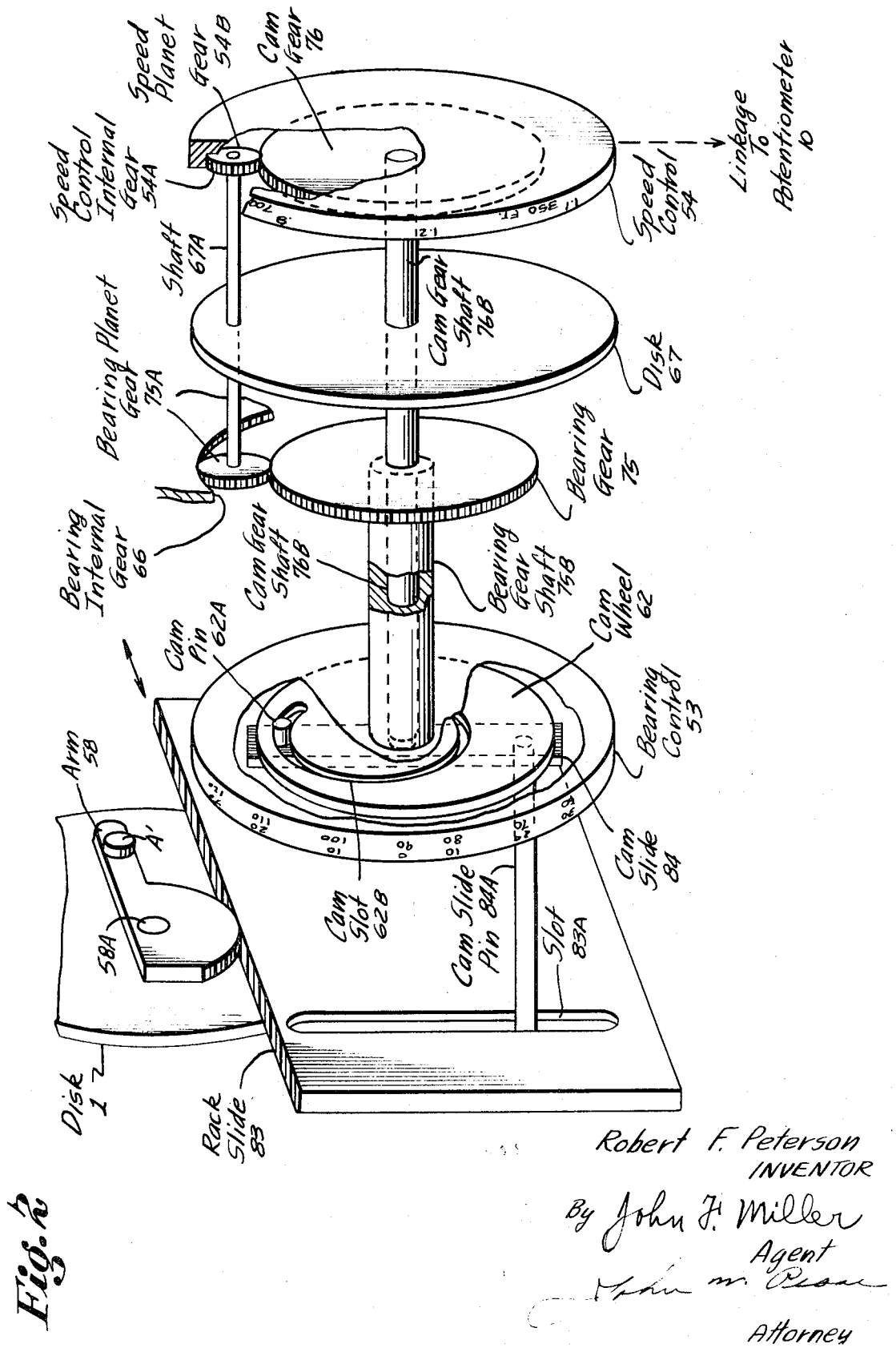

SPEED AND BEARING INTEGRATOR

BACKGROUND OF THE INVENTION

The invention is in the field of training devices, more particularly antisubmarine warfare training devices. One requirement of antisubmarine warfare training devices such as a sonar simulator is apparatus for simulating a submarine "signature." This is a means for producing a train of signals which will duplicate the signals generated by an acutal submarine as detected by the submarine detecting apparatus of the training device.

Submarine "signatures" are individually characteristic of particular types of submarines and are affected by the submarine's speed and bearing. Prior art training devices have adjustable apparatus whereby an instructor can set submarine speed and bearing. Unfortunately these prior art devices have been characterized by complexity, bulk, and undesirable interactions between the speed and bearing controls. The invention solves these problems.

SUMMARY OF THE INVENTION

A rotating disc has submarine "signature" information recorded thereon in four separate concentric tracks. Two fixed readout heads and two moveable readout heads are provided to read out the information, one head for each track. A fixed head and a moveable head are paried and their combined outputs represent the signature of a simulated submarine. Speed and bearing controls for the simulated submarine may be adjusted by an instructor to alter the characteristic signature accordingly by moving a moveable head with respect to its associated fixed head. Means are provided for adjusting either the speed or bearing settings without affecting the indication of the other.

DESCRIPTION OF THE DRAWINGS

FIG. 2 illustrates the mechanical principles of the invention.

Figure 1:
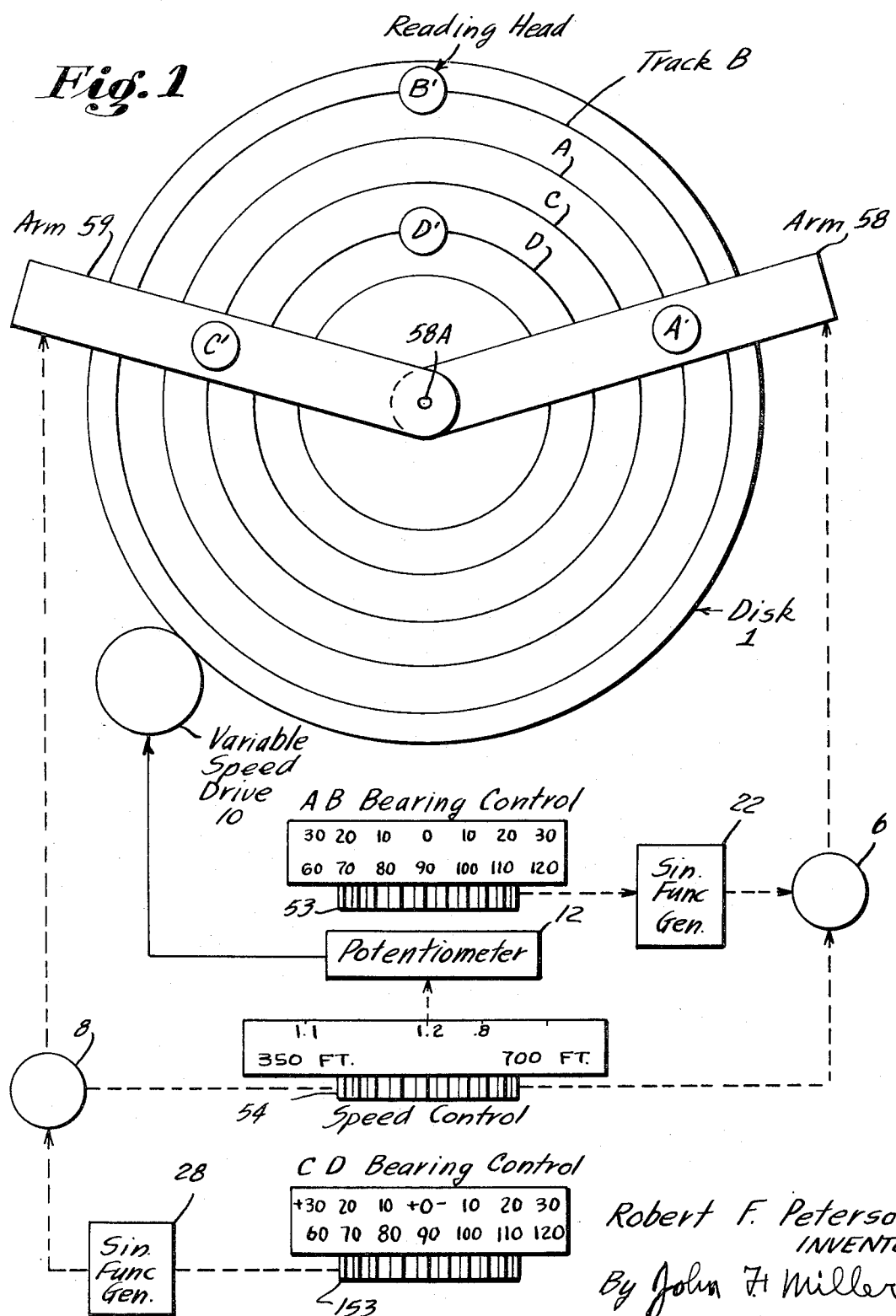
FIG. 1 illustrates the general arrangement of the invention.

DESCRIPTION OF THE PREFERRED EMBODIMENT:

FIG. 1 is a functional diagram of the invention. A disk 1 contains four sets of information on four tracks, reading from the periphery, tracks B, A, C, and D. Fixed reading heads B' and D' are positioned to read out the information recorded on tracks B and D respectively. Moveable heads A' and C' are mounted on two respective moveable arms 58 and 59 and positioned to read out information from tracks A and C respectively. Arms 58 and 59 may be rotated around the axis 58A of disk 1 by linkages, shown here as dashed lines, from two respective mechanical universals 6 and 8. In practice these linkages may comprise suitable racks, gears, pinions, etc. Disk 1 may be driven by a variable speed motor 10 which is controlled by a potentiometer 12. A speed control 54 having an integral speed indicating dial affixed thereto is linked to control the setting of potentiometer 12. Speed control wheel 54 is connected by suitable linkages to furnish an input to universal 6 and to universal 8. An "A-B" bearing control 53 having an integral indicating dial furnishes an input through suitable linkages and a mechanical sin function generator 22 to a second input to universal 6. A "C-D" bearing control 153 having an integral dial is linked through a sin function generator to a second input of universal 8.

The terms "A-B" bearing and "C-D" bearing refer to the tracks on disk 1. Information is read out of tracks A and B by respective heads A' and B'. The information is combined in apparatus which is not part of this invention and used to indicate the bearing of a simulated target submarine in the training device with which the invention is associated. The bearing indication is determined by the phase difference between the information from moveable head A' and fixed head B'. The phase difference is established by the position of A' with respect to B'. Therefore when A-B bearing control 53 is rotated arm 58 is rotated to move A' and thus cause a change in the target bearing indication. The C-D bearing is established in a similar manner by movement of arm 59 when C-D bearing control 153 is rotated. This changes the indicated bearing of a simulated target in another coordinate at the display apparatus of the associated training device.

The target speed indicated is determined by information from a track on disk 1 which may be derived from, for example, a fixed readout head. The speed of disk 1 is changed by adjusting variable speed drive 10 by means of speed control 54 and potentiometer 12. In prior art devices a change of indicated target speed accomplished by changing the speed of disk 1 resulted in an undersired change in the indicated bearing. This limited the effectiveness of the training device by restricting the training problems which could be presented. The change of bearing indication was unavoidable because as previously explained, the bearing indication is developed from a phase difference between the A' and the B' outputs and a change in disk speed results in a phase shift between the A' and B' outputs.

The invention overcomes this problem of the prior art by linking the movement of speed control wheel 54 to universals 6 and 8 as well as potentiometer 12. Thus a change of speed of disk 1 is accompanied by a compensatory change of position of arms 58 and 59 and moveable readout heads A' and C'. The apparatus is so designed that the movement of A' and C' counteracts the phase shift in the A-B and C-D information outputs caused by the change in disk speed. A change in the A-B bearing is made by moving wheel 53 to reposition arm 58. In the same manner movement of wheel 153 repositions arm 59. Friction in the speed control wheel and the bearing control wheels is such that movement of any wheel has no effect on the other wheels. Therefore either of bearings A-B or C-D, or speed, can be adjusted without affecting the setting of any other control wheel. This results in a great increase in accuracy, realism and effectiveness of the training device of which the invention is a part.

FIG. 2 illustrates the mechanical principles of the invention. FIG. 2 is not an accurate representation of the actual structure or dimensions of applicant's invention but is an exploded isometric view of apparatus explaining the inventive concept. FIG. 2 shows only one-half, or one side, of the actual apparatus.

The bearing control 53 is a wheel having a peripheral dial as shown and is integral with a earing gear 74 and a bearing gear shaft 75B. When the bearing of a simulated target is adjusted by rotating bearing control 53 bearing gear 75 rotates so that a bearing planet gear 75A travels around a concentric bearing internal gear 66 which is fixed to a housing which encloses and supports the apparatus. The housing is not shown. Bearing planet gear 75A rotates on a shaft 67A which is fixed in a disk 67 which rotates on a cam gear shaft 76B which is integral with a cam gear 76. Cam gear 76 is connected by a speed planet gear 54B to a speed internal gear 54A which is fixed inside the rim of speed control wheel 54. Speed planet gear 54B rotates on shaft 67A. Cam gear shaft 76B passes through an axial bore in bearing gear shaft 75B and is fixed to a cam wheel 62 so that cam gear 76 and cam wheel 62 rotates together with shaft 76B.

Bearing control 53 and speed control 54 are retained in the position to which set by friction. When bearing control 53 is rotated a cam slide 84 retained in a slot in 53 and having a cam slide pin 84A integral therewith is rotated around the rotational axis of 53. Pin 84A passes through a slot 83A in a rack slide 83 to impart lateral movement to 83. Rack slide 83 has integral teeth which mesh with teeth on an arcuate section of an extension of arm 58 causing 58 to move around a center shaft 58A on which disk 1 rotates. (Arm 58 and disk 1 are shown in greatly reduced scale with respect to other elements of FIG. 2) Pickup head A' is moved with respect to fixed pickup head B' of FIG. 1 to cause the bearing indication to change as explained in the discussion of FIG. 1.

Rotation of bearing gear 75 causes bearing planet gear 75A to travel around bearing internal gear 66 which causes shaft 67A and disk 67 to move around cam gear shaft 76B and speed planet gear 54B to travel around cam gear 76 and speed control internal gear 54A. Since speed control 54 and integral internal gear 54A are retained in position by friction, cam gear 76 will rotate thus rotating shaft 76B and cam wheel 62. This rotation will be in the same direction and at the same speed as the rotation of bearing gear 75 and bearing control 53 because bearing gear 75 is the same diameter as cam gear 76, planet gear 75A is the same diameter as planet gear 54B and bearing internal gear 66 is the same diameter as internal gear 54A.

Since bearing control 53 and cam wheel 62 are rotating together and cam slide 84 is in a slot in bearing control 53 then bearing control 53, cam wheel 62, cam pin 62A, cam slide 84 and cam slide pin 84A rotate as a single unit and impart lateral movement to rack slide 83 in proportion to radial position of cam slide pin 84A and the rotational position of bearing control 53. Cam pin 62A rides in a cam slot 62B in cam wheel 62 so that rotation of the cam wheel with respect to bearing control 53 causes cam slide 84 to move radially in bearing control 53. This positions cam slide pin 84A a variable distance with respect to the rotational axis of 53. Depending on the position of 53, this may impart a lateral movement to rack slide 83 and pin 84A and rotate arm 58 and pickup head A' through an angle proportional to the position of bearing control 53 and the relative movement of speed control 54. Rotation of bearing control 53 does not change the radial position of cam slide 84 and pin 84A unless speed control 54 is operated.

It is apparent that movement of speed control 54, which through linkage to potentiometer 10 changes the rotational speed of disk 1, feeds back a compensating movement to readout head A' so that the bearing indication in the training device does not change. It is also apparent that a change in the position of bearing control 53 will reposition pickup head A' an amount proportional to the position of 53 and speed control 54.

It should be noted that pickup head C' on arm 59 of FIG. 1 is controlled in the same manner by complementary elements not shown in Fig. 2. These elements are not shown to avoid additional complication of the drawing.

It is again emphasized that FIG. 2 is not an exact scale showing of applicant's novel apparatus but is merely illustrative of the inventive principles involved. The elements of the actual apparatus are of such size and shape that a very compact arrangement of nested elements is achieved. For example the bearing control wheel 53 and speed control wheel 54 are adjacent each other with only enough clearance to permit non-interfering movement. The long shafts of FIG. 2 are in fact short pins and bushings.

The result is a very compact speed and bearing control apparatus which greatly enhances the realism and effectiveness of the training device of which it is an essential part.

What is claimed is:

1. In a sonar training device having means for indicating speed and bearing of a simulated submarine target, the improvement comprising:

bearing control means for controlling the bearing indication of a simulated submarine target, speed control means for controlling the speed indication of a simulated submarine target, differential means connecting said control means whereby either of said bearing control means or said speed control means may be adjusted without affecting the indication of the other, bearing indication signal generating means, speed indication signal generating means, said differential means including means for adjusting said bearing indication signal generating means when said speed control means are adjusted, said bearing indication signal generating means and said speed indication signal generating means comprising a rotating disk having a plurality of submarine signature information bearing tracks recorded thereon, a first fixed readout head positioned to read out information from a first of said tracks, a first moveable readout head positioned to read out information from a second of said tracks, a second fixed readout head positioned to read out information from a third of said tracks, a second moveable readout head positioned to read out information from a fourth of said tracks, the information read out by said first readout heads being adapted to be combined into a first bearing indication, the information read out by said second readout heads being adapted to be combined into a second bearing indication, said bearing control means including means for adjusting said first bearing indication by moving said first moveable readout head with respect to said first fixed head, and means for adjusting said second bearing indication by moving said second moveable readout head with respect to said second fixed readout head.

2. The apparatus of claim 1, said bearing control means comprising a rotatable bearing control wheel having an integral indicating dial rotatable therewith, variable speed driving means for rotating said rotating disk,
said speed control means comprising a rotatable speed control wheel having an integral indicating dial rotatable therewith, and connecting means connecting said speed control means to said variable speed drive means to vary the speed of said rotating disk.

* * * * *